United States Patent Office 3,361,798
Patented Jan. 2, 1968

3,361,798
PREPARATION OF CYCLOHEXYLSULFAMIC ACID OR METAL SALTS THEREOF
Oscar G. Birsten, New York, N.Y., and Jacob Rosin, Maplewood, N.J., assignors to Baldwin-Montrose Chemical Company, Incorporated, a corporation of Indiana
No Drawing. Filed Feb. 17, 1964, Ser. No. 345,133
5 Claims. (Cl. 260—513.6)

This application is a continuation-in-part of our co-pending application Ser. No. 310,127 filed Sept. 19, 1963.

In said co-pending application, cyclohexylsulfamic acid and its metal salts are prepared by first forming the complex $R_3N \cdot SO_3$ (R being a lower alkyl radical from the group consisting of methyl, ethyl, propyl and combinations thereof) by reacting the corresponding amine with $SO_3$ and then reacting the complex formed with cyclohexylamine, thus obtaining the trialkyl amine salt of cyclohexylsulfamic acid, which could then be transformed into the desired metal salt.

We have now found that these two last-mentioned reactions can be combined into one single step by reacting the complex with a solution or suspension of the metal hydroxide in an aqueous solution of cyclohexylamine. In this way, the complex is transformed directly into the metal salt of cyclohexylsulfamic acid in one single step.

Preferably, the complex, hydroxide and cyclohexylamine are employed in stoichiometric quantities but some departure from this ratio may be made. In some instances it is desirable to employ an excess of about 10% of the hydroxide.

A wide range of temperatures can be used. The reaction slows down as the temperature is lowered below 15° C. and it can be considered as practically instantaneous in the 30–35° C. range. Higher temperatures are somewhat disadvantageous because they cause some hydrolysis of the complex.

The complex can be added as a slurry in an inert solvent, but we prefer to use dry complex produced by a gas-phase reaction. The metal hydroxide can be either added all at once to the aqueous cyclohexylamine solution prior to the gradual addition of the complex, a procedure which would be preferable for hydroxides of low solubility such as calcium hydroxide, or it can be added gradually simultaneously with the addition of the complex, a procedure which would be preferable for hydroxides of high solubility, such as sodium hydroxide, which in high concentrations can salt out cyclohexylamine and create unnecessarily a two-phase reaction.

The following non-limiting examples illustrate various embodiments of the invention.

EXAMPLE I 139 g. (1 mole) of dry trimethylamine-sulfur trioxide complex is added slowly to a mixture of 40 g. $Ca(OH)_2$ in 110 g. $H_2O$ and 99 g. cyclohexylamine under stirring and cooling to maintain the temperature of 35° C. After the end of the addition, the mixture is slowly heated to reflux while collecting the trimethylamine escaping from the condenser. After the end of trimethylamine evolution the resulting aqueous solution of calcium cyclohexylsulfamate is ready for isolation and purification, as is set forth in the above-identified co-pending patent application.

EXAMPLE II 181 g. (1 mole) of triethylamine-sulfur trioxide complex suspended in 750 g. perchloroethylene is added slowly under stirring and cooling to maintain a temperature of 30° C. to a solution of 40 g. NaOH and 99 g. cyclohexylamine in 500 g. water. After the end of addition, the agitation was continued for one hour, then the liberted triethylamine was fractionated off and the aqueous layer containing sodium cyclohexylsulfamate separated from the organic layer. The sodium cyclohexylsulfamate can then be isolated and purified by known procedures.

EXAMPLE III 139 g. (1 mole) of trimethylamine-sulfur trioxide complex and 80 g. of 50% NaOH solution are added simultaneously and slowly to a solution of 99 g. cyclohexylamine and 4 g. NaOH in 250 g. $H_2O$ under stirring and cooling to maintain a temperature of 25° C. After the end of addition, the trimethylamine is recovered as described in Example I and the resulting sodium cyclohexylsulfamate can be isolated and purified by known procedures.

We claim:
1. The preparation of a calcium or sodium salt of cyclohexylsulfamic acid comprising reacting at a temperature from about 15° C. to about 35° C. the complex $R_3N \cdot SO_3$ wherein R is selected from the group consisting of methyl, ethyl and propyl radicals and combination thereof with an aqueous solution of cyclohexylamine containing calcium or sodium hydroxide.
2. A process in accordance with claim 1 in which the complex is added in solid form.
3. A process in accordance with claim 1 in which the complex is trimethylamine-sulfur trioxide.
4. A process in accordance with claim 1 in which the hydroxide is sodium hydroxide.
5. A process in accordance with claim 1 in which the hydroxide is calcium hydroxide.

References Cited

UNITED STATES PATENTS 2,275,125   3/1942   Audrieth et al. _____ 260—500
2,655,528   10/1953  Hardy et al. _____ 260—500

FOREIGN PATENTS 669,200   3/1962   Great Britain.

OTHER REFERENCES

Allied Chemical, "Reactions of Sulfur Trioxide," (1959) pp. 5 and 6.

LEON ZITVER, *Primary Examiner.*
J. EVANS, *Assistant Examiner.*